(12) United States Patent
Zeng et al.

(10) Patent No.: US 9,865,947 B2
(45) Date of Patent: Jan. 9, 2018

(54) SIM CONNECTOR

(71) Applicant: Molex, LLC, Lisle, IL (US)

(72) Inventors: Shang Xiu Zeng, Chengdu (CN); Hong Liang Wang, Chengdu (CN); Kian Heng Lim, Singapore (SG)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/005,626

(22) Filed: Jan. 25, 2016

(65) Prior Publication Data

US 2016/0240943 A1 Aug. 18, 2016

(30) Foreign Application Priority Data

Jan. 23, 2015 (CN) .......................... 2015 1 0036854
Jan. 23, 2015 (CN) ..................... 2015 2 0049366 U

(51) Int. Cl.
| | |
|---|---|
| *H01R 13/40* | (2006.01) |
| *H01R 12/70* | (2011.01) |
| *H01R 13/24* | (2006.01) |
| *G06K 7/00* | (2006.01) |
| *H01R 12/71* | (2011.01) |

(52) U.S. Cl.
CPC .......... *H01R 12/707* (2013.01); *G06K 7/003* (2013.01); *G06K 7/0021* (2013.01); *H01R 12/718* (2013.01); *H01R 13/2492* (2013.01)

(58) Field of Classification Search
CPC H01R 13/2442; H01R 23/7068; H01R 27/00; G06K 7/0021; G06K 13/08
USPC ...................... 439/630, 159, 733.1
See application file for complete search history.

(56) References Cited

U.S. PATENT DOCUMENTS

| | | | | |
|---|---|---|---|---|
| 5,173,055 A | * | 12/1992 | Grabbe | H01R 13/2492 439/591 |
| 5,358,411 A | * | 10/1994 | Mroczkowski | H01R 12/85 439/66 |
| 6,050,857 A | * | 4/2000 | Lok | H01R 13/2442 439/630 |
| 6,305,960 B1 | * | 10/2001 | Fan | G06K 7/0021 439/188 |
| 6,497,581 B2 | | 12/2002 | Slocum et al. | |
| 6,994,566 B2 | * | 2/2006 | You | H01R 13/2442 439/66 |
| 7,217,148 B1 | * | 5/2007 | Chen | G06K 7/0021 439/326 |

(Continued)

FOREIGN PATENT DOCUMENTS

| | | |
|---|---|---|
| CN | 101752699 A | 6/2010 |
| CN | 103268998 A | 8/2013 |

(Continued)

*Primary Examiner* — Abdullah Riyami
*Assistant Examiner* — Vladimir Imas
(74) *Attorney, Agent, or Firm* — James A. O'Malley

(57) ABSTRACT

An electronic card connector comprises: an insulating housing and a plurality of terminals mounted to the insulating housing. Each terminal comprises two resilient arms, a contacting structure and a tail. The two resilient arms each have a first end and a second end, the two first ends of the two resilient arms are spaced apart from each other and fixed to the insulating housing, and the two second ends of the two resilient arms are connected to the contacting structure. The contacting structure comprises a convex curved surface for contacting the corresponding conducting pad of the electronic card.

10 Claims, 14 Drawing Sheets

(56) References Cited

U.S. PATENT DOCUMENTS

| | | | | |
|---|---|---|---|---|
| 7,371,073 | B2* | 5/2008 | Williams | H01R 13/2407 439/66 |
| 7,510,444 | B2* | 3/2009 | Chang | H01R 13/2442 439/630 |
| 7,837,486 | B2* | 11/2010 | Li | H01R 13/635 439/159 |
| 7,913,914 | B2 | 3/2011 | Nilsson | |
| 7,967,640 | B2 | 6/2011 | Hashimoto et al. | |
| 8,079,876 | B2* | 12/2011 | Wang | H01R 13/2442 439/630 |
| 8,337,223 | B2* | 12/2012 | Gao | G06K 13/0856 439/159 |
| 8,821,191 | B2* | 9/2014 | Soo | H01R 12/55 439/630 |
| 9,300,070 | B2* | 3/2016 | Yoshikawa | H01R 13/24 |
| 9,318,832 | B2* | 4/2016 | Shimada | H01R 13/2442 |
| 2009/0137136 | A1* | 5/2009 | Shen | G06K 7/0021 439/83 |
| 2010/0178807 | A1* | 7/2010 | Hashimoto | H01R 12/714 439/630 |

FOREIGN PATENT DOCUMENTS

| | | |
|---|---|---|
| CN | 203826608 U | 9/2014 |
| CN | 204088671 U | 1/2015 |
| CN | 204118329 U | 1/2015 |
| CN | 104393433 A | 3/2015 |
| CN | 105098415 A | 11/2015 |

* cited by examiner

SIM CONNECTOR

RELATED APPLICATIONS

This application claims priority to Chinese Application No. 201510036854.X, filed Jan. 23, 2015, and to Chinese Application No. 201520049366.8, filed Jan. 23 2015, both of which are incorporated herein by reference in their entirety.

TECHNICAL FIELD

The present disclosure relates to an electronic card connector, and more specifically relates to an electronic card connector in which an electronic card is not easily damaged due to scrapping.

BACKGROUND ART

An electronic card generally having conducting pads, for example a SIM card, is generally used to insert into an insertion slot of an electronic product so as to establish an electrical connection with an electrical connector. After the electronic card is inserted into the insertion slot via an entrance of the insertion slot, the electronic card needs to further move a certain distance and then reaches a preset position, so as to allow the conducting pads of the electronic card to respectively contact corresponding terminals of the electrical connector.

However, with respect to the arrangement of the terminals of the electrical connector, besides the terminals should be matched with the conducting pads of the electronic card in position, it should further meet requirements, such as structural strength of the electrical connector, compactness of the electrical connector, contact stability between the terminals and the conducting pads and the like, therefore the electrical connector may have various configurations in design. In one of these configurations, a terminal of an electrical connector has two resilient arms, and two free ends of the two resilient arms are connected to each other so as to form a contacting portion, the terminals are arranged so that an extension direction of the two resilient arms is intersected with an insertion direction of the electronic card (a movement direction), during a process that the electronic card is inserted into the insertion slot via the entrance of the insertion slot and moves to reach the preset position, because a side surface and a top surface of each resilient arm form a right angle therebetween, the side surface of each resilient arm easily and seriously scrapes the conducting pad of the electronic card, thereby damaging the conducting pad of the electronic card due to serious scrapping. For example, Chinese patent application publication No. CN102741856A (corresponding to U.S. Pat. No. 7,913,914B2) discloses a card connector, in which a contacting portion of a terminal is a curved surface, however, in one of the embodiments, along an insertion direction of an electronic card, the terminal contacts a conducting pad of an electronic card via a side edge of the resilient arm, which not only easily damages the conducting pad of the electronic card due to serious scrapping, but also easily makes insertion and ejection of the electronic card not smooth.

SUMMARY OF THE INVENTION

Therefore, an object of the present disclosure is to provide an electronic card connector so as to resolve the previous problem.

Therefore, in some embodiments, an electronic card connector of the present disclosure is configured to be mounted on a circuit board so as to be electrically connected to an electronic card having a plurality of conducting pads, the electronic card connector comprises an insulating housing and a plurality of terminals mounted to the insulating housing. Each terminal comprises two resilient arms, a contacting structure and a tail for being soldered to the circuit board. The two resilient arms each have a first end and a second end, the two first ends of the two resilient arms are spaced apart from each other and fixed to the insulating housing, and the two second ends of the two resilient arms are connected to the contacting structure. The contacting structure comprises a convex curved surface, the convex curved surface has two outside edges respectively connected to two outside edges of the two resilient arms, a first portion positioned at a middle region of the convex curved surface and curved upwardly for contacting the corresponding conducting pad of the electronic card and two second portions each positioned between the first portion and the corresponding outside edge of the convex curved surface and curved downwardly from the first portion toward the corresponding outside edge of the convex curved surface, the two outside edges of the convex curved surface is lower than the first portion of the convex curved surface in height.

In some embodiments, the first portion and the two second portions of the convex curved surface are identical in curvature. In some embodiments, the tail is positioned between the two resilient arms.

In some embodiments, the insulating housing comprises an insulating plate portion, each terminal further comprises a fixed portion connecting the two resilient arms and the tail, and the fixed portion is embedded in the insulating plate portion, the plurality of terminals are mounted in the insulating plate portion in two rows, and the contacting structures of the terminals in the two rows respectively protrude at two opposite sides of the insulating plate portion.

In some embodiments, the insulating housing further comprises two insulating frame portions respectively connected to the two opposite sides of the insulating plate portion, and the two insulating frame portions each cooperate with the insulating plate portion to define a receiving space for receiving the terminals. In some embodiments, the insulating housing further comprises two metal strengthening plates respectively embedded in the two insulating frame portions.

In some embodiments, an electronic card connector of the present disclosure is configured to be mounted on a circuit board so as to be electrically connected to an electronic card having a plurality of conducting pads, the electronic card connector comprises an insulating housing and a plurality of terminals mounted to the insulating housing. Each terminal comprises two resilient arms, a contacting structure and a tail for being soldered to the circuit board. The two resilient arms each have a first end and a second end, the two first ends of the two resilient arms are spaced apart from each other and fixed to the insulating housing, and the two second ends of the two resilient arms are connected to the contacting structure, an overall surface of the contacting structure opposite to the circuit board is a part of a spherical surface.

In some embodiments, the overall surface of the contacting structure opposite to the circuit board has two outside edges respectively connected to the two outside edges of the two resilient arms, a middle contact region for contacting the corresponding conducting pad of the electronic card and a side contact region, the side contact region is adjacent to one of the two outside edges of the overall surface of the contacting structure opposite to the circuit board.

BRIEF DESCRIPTION OF THE DRAWINGS

The other features and effects of the present disclosure will be apparent through the embodiments in combination with the Figures, and.

DETAILED DESCRIPTION OF THE PREFERRED EMBODIMENTS

Figure 1:
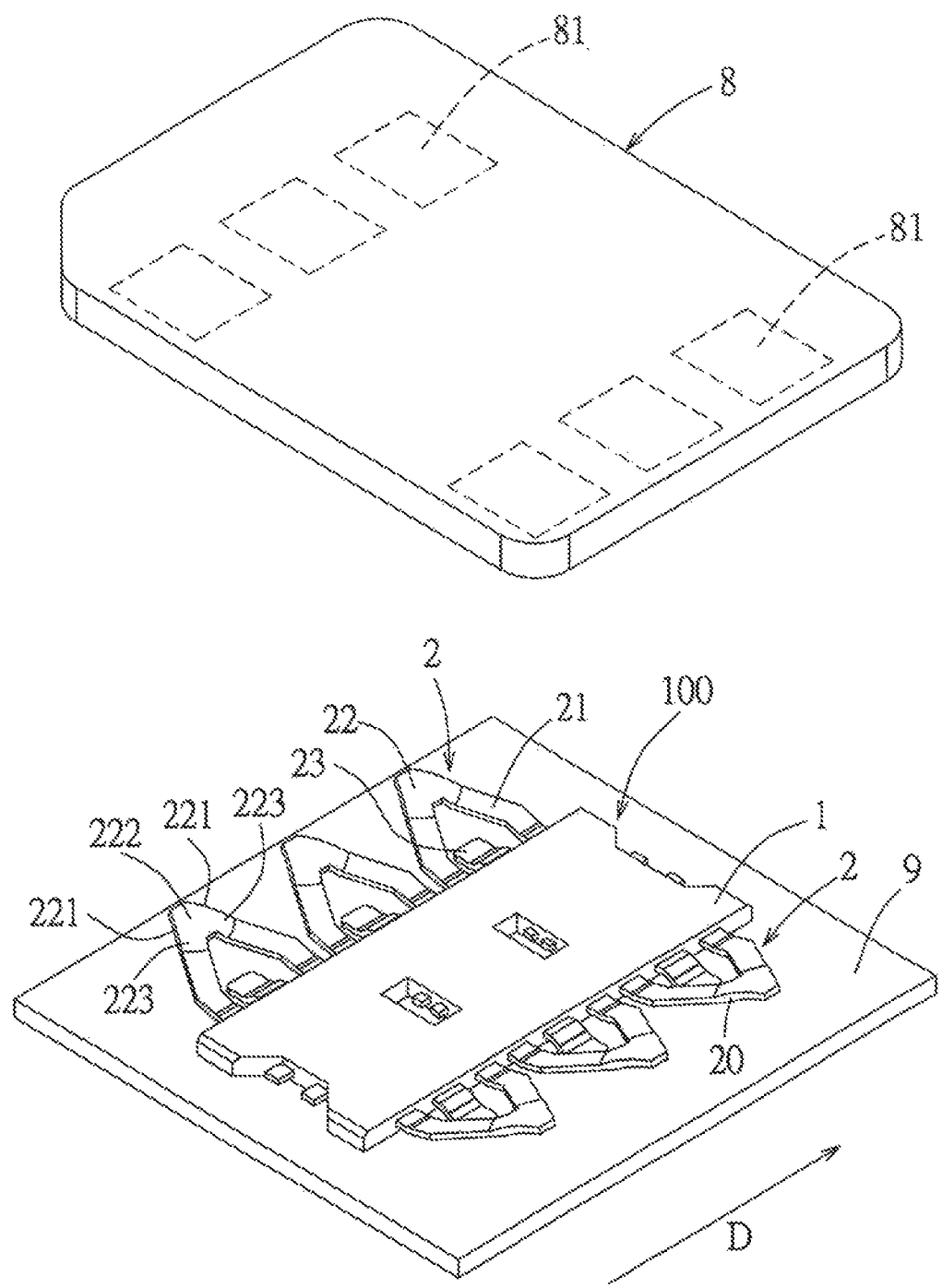
FIG. 1 is a perspective view illustrating a first embodiment of an electronic card connector of the present disclosure mounted on a circuit board and a corresponding relationship between the first embodiment of the electronic card connector of the present disclosure and an electronic card.
Figure 2:
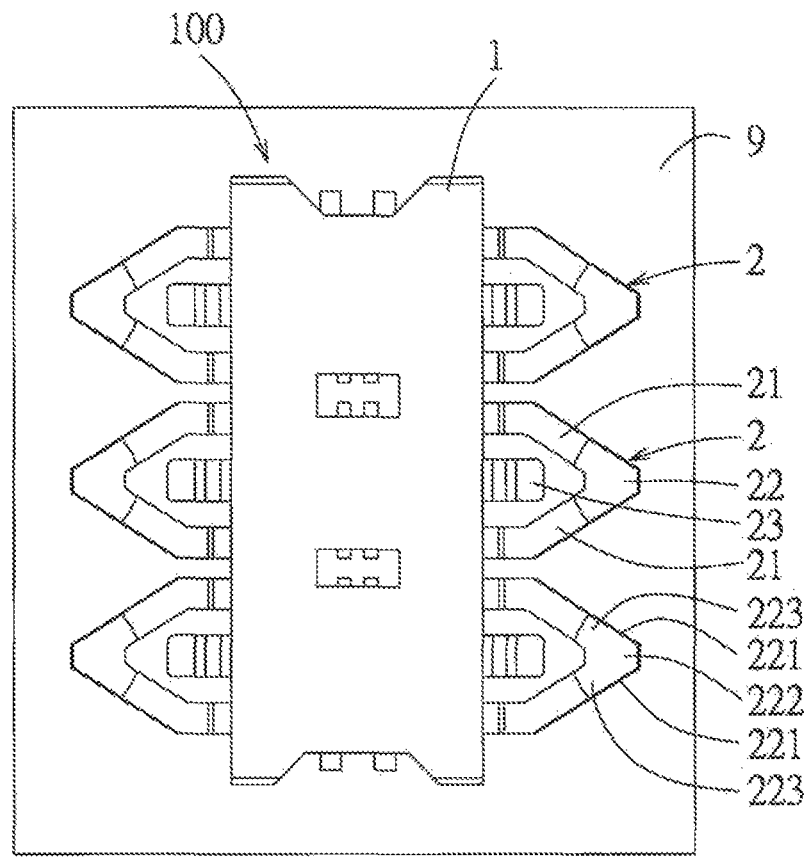
FIG. 2 is a top view illustrating the first embodiment.
Figure 3:
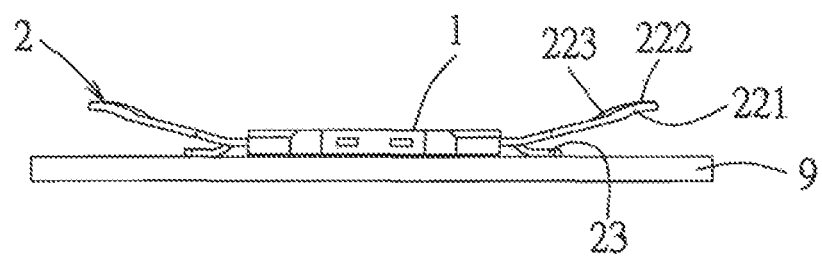
FIG. 3 is a side view illustrating the first embodiment.

Before the present disclosure is described in detail, it should be note that a similar member is indicated by the same reference numeral in the following description. An effect of the present disclosure lies in that each contacting structure comprises the convex curved surface having the first portion (the middle contact region) and the second portion (the side contact region), it can prevent the conducting pads of the electronic card from being damaged due to serious scrapping during movement of the electronic card, and the first portion (the middle contact regions) can stably contact the corresponding conducting pads, thereby assuring the stability of the electrical connection.

Referring to FIG. 1 to FIG. 5, a first embodiment of an electronic card connector 100 of the present disclosure is configured to be mounted on a circuit board 9 so as to be electrically connected to an electronic card 8 having a plurality of conducting pads 81. The electronic card connector 100 comprises an insulating housing 1 and a plurality of terminals 2. In the first embodiment, the insulating housing 1 has a plate-like shape, and the plurality of terminals 2 are mounted to the insulating housing 1 in two rows, the terminals 2 in each row are arranged along an insertion direction D.

Each terminal 2 comprises two resilient arms 21, a contacting structure 20, a tail 23 for being soldered to the circuit board 9 and a fixed portion 24 connecting the two resilient arms 21 and the tail 23 and embedded in the insulating housing 1. The two resilient arms 21 each have a first end 211 and a second end 212, the two first ends 211 of the two resilient arms 21 are spaced apart from each other and are fixed to the insulating housing 1, and the two second ends 212 of the two resilient arms 21 are connected to the contacting structure 20. The contacting structure 20 comprises a convex curved surface 22, the convex curved surface 22 has two outside edges 221 respectively connected to two outside edges of the two resilient arms 21, a first portion 222 positioned in a middle region of the convex curved surface 22 and curved upwardly for contacting the corresponding conducting pad 81 of the electronic card 8 and two second portions 223 each positioned between the first portion 222 and the corresponding outside edge 221 and curved downwardly from the first portion 222 toward the corresponding outside edge 221 of the convex curved surface 22, and the two outside edges 221 of the convex curved surface 22 are lower than the first portion 222 of the convex curved surface 22 in height.

In the first embodiment, the contacting structures 20 of the terminals 2 in the two rows respectively protrude at two opposite sides of the insulating housing 1, the second portion 223 of each terminal 2 in the two rows which first contacts the electronic card 8 is the second portion 223 facing an insertion slot (not shown, that is, an entrance via which the electronic card 8 is inserted into the electronic card connector 100) side, that is, the first portion 222 is a middle contact region, the second portion 223 facing the insertion slot side is a side contact region, and the second portion 223 facing the insertion slot side is close to the insertion slot relative to the first portion 222, when the electronic card 8 is inserted into the electronic card connector 100 via the insertion slot and is moved relative to the plurality of terminals 2 along the insertion direction D, because the second portion 223 (the side contact region) is the curved surface, the conducting pad 81 of the electronic card 8 can smoothly move onto the first portion 222 (the middle contact region) via the second portion 223, the second portion 223 is the curved surface and does not damage the conducting pad 81 of electronic card 8 due to serious scrapping during the contact from the second portion 223. When the electronic card 8 has reached to a preset position, all the first portions 222 of the plurality of terminals 2 can respectively contact the corresponding conducting pads 81 of the electronic card 8, so that a stable electrical connection is established.

In the first embodiment, the first portion 222 and the two second portions 223 together constitute an overall surface of the contacting structure 20 opposite to the circuit board 9, that is to say, the two second portions 223 are connected to the first portion 222 and respectively extend to the two outside edges 221, and the first portion 222 and the two second portions 223 are identical in curvature. Specifically, the overall surface of the contacting structure 20 opposite to the circuit board 9 is a part of a spherical surface. In this manner, the contacting structure 20 is easily formed during the manufacturing of the terminal 2. However, it is not necessary to limit that the first portion 222 and the two second portions 223 are identical in curvature, that is, the present disclosure is not limit to the curvature relationship therebetween in the first embodiment.

Figure 4:
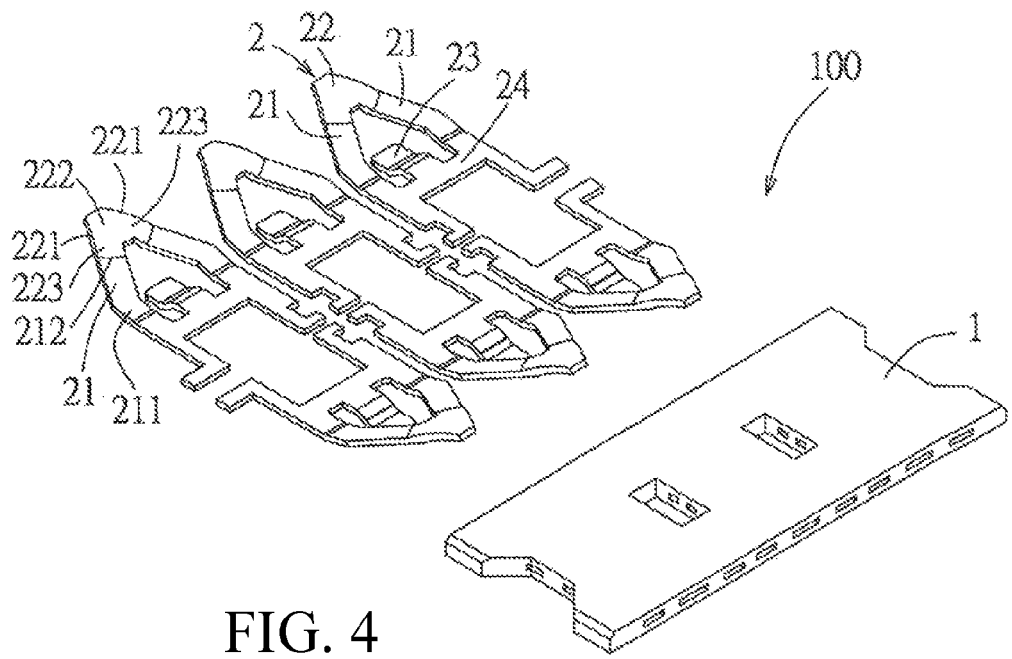
FIG. 4 is an exploded perspective view illustrating an insulating housing and terminals of the first embodiment.
Figure 5:
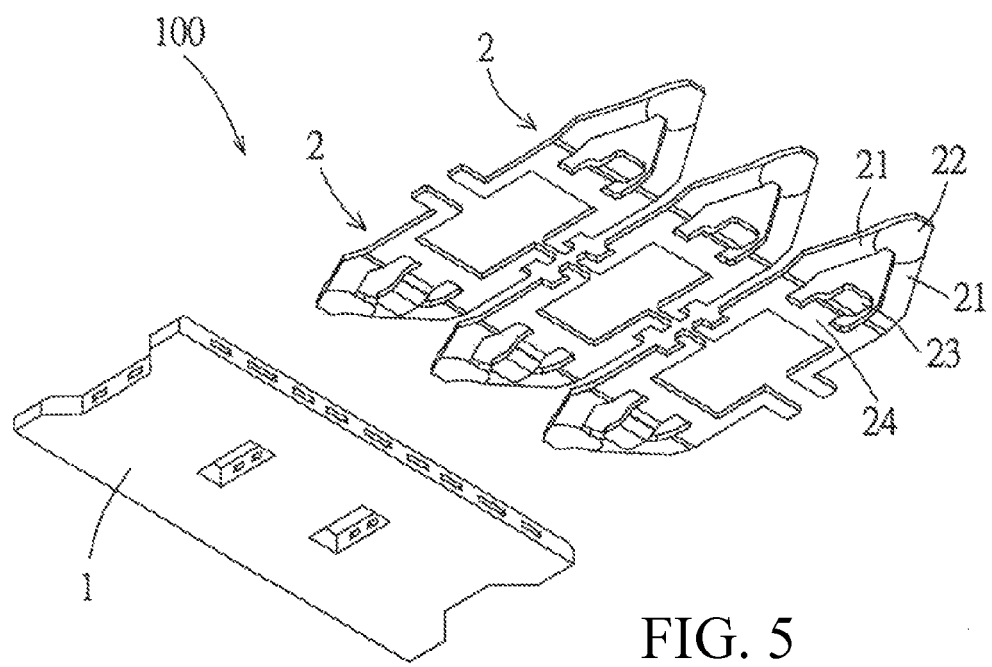
FIG. 5 is a view of FIG. 4 viewed from another angle.
Figure 6:
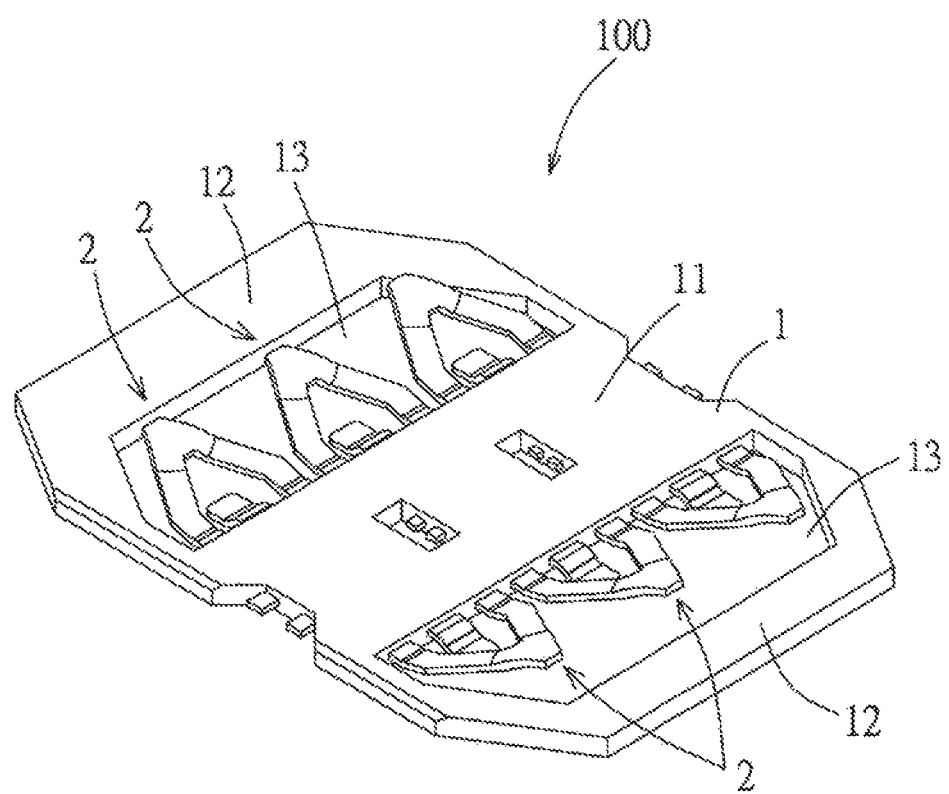
FIG. 6 is a perspective view illustrating a second embodiment of an electronic card connector of the present disclosure.
Figure 7:
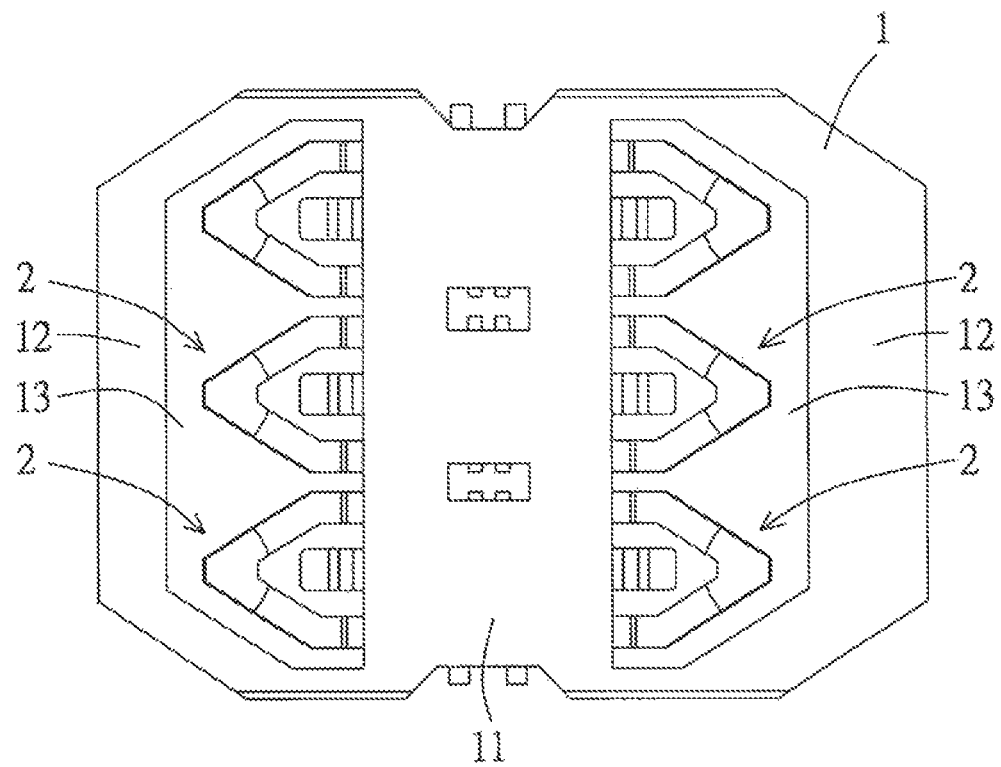
FIG. 7 is a top view illustrating the second embodiment.
Figure 8:
FIG. 8 is a side view illustrating the second embodiment.
Figure 9:
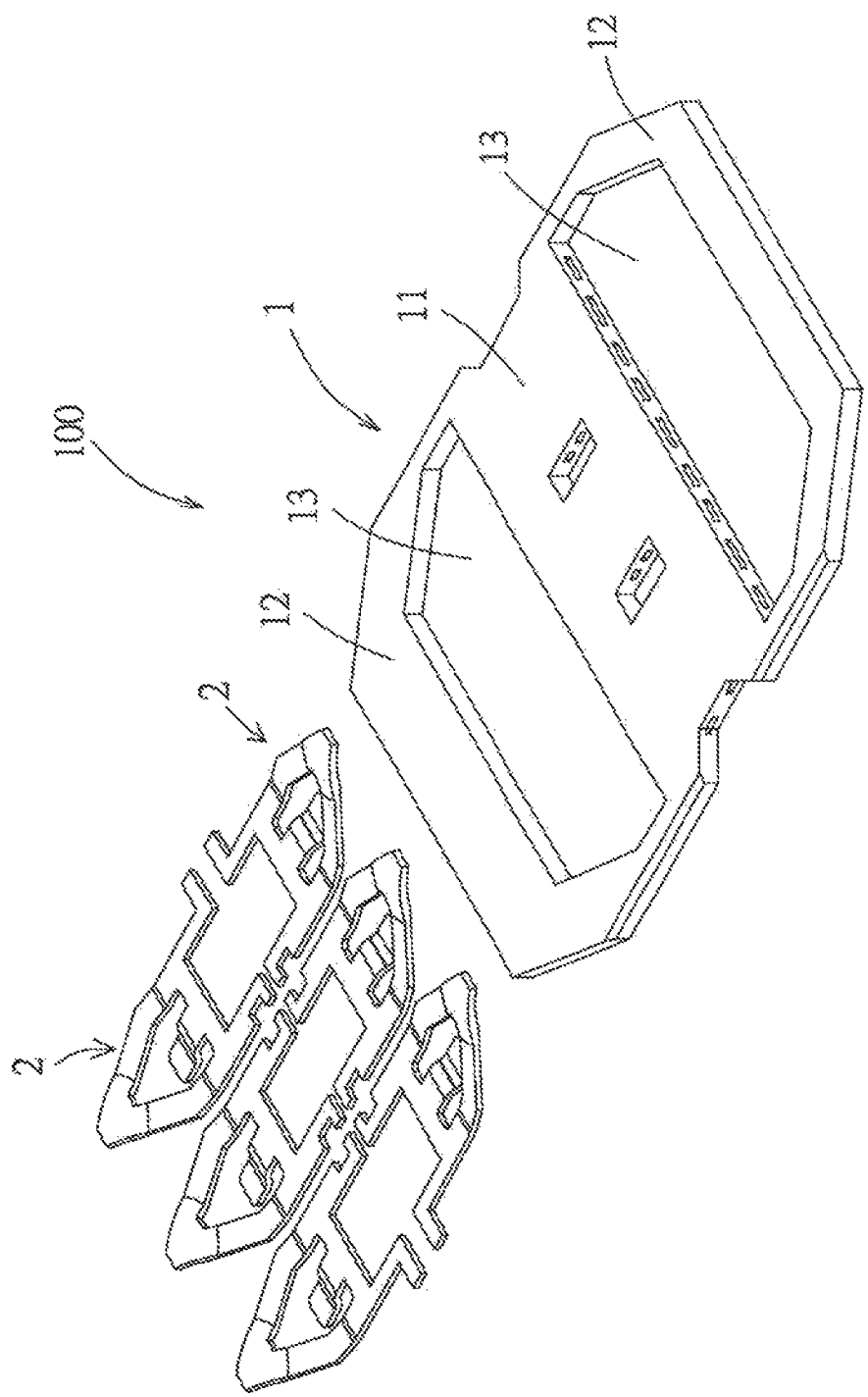
FIG. 9 is an exploded perspective view illustrating an insulating housing and terminals of the second embodiment.

Referring to FIG. 4 and FIG. 5, in the first embodiment, the tail 23 of each terminal 2 extends from the fixed portion 24 and is positioned between the two resilient arms 21 and is positioned outside the insulating housing 1.

Referring to FIG. 6 to FIG. 9, a second embodiment of an electronic card connector 100 of the present disclosure is substantially the same with the first embodiment, however, in the second embodiment, the insulating housing 1 comprises an insulating plate portion 11 and two insulating frame portions 12 respectively connected to two opposite sides of the insulating plate portion 11, and the two insulating frame portions 12 each cooperate with the insulating plate portion 11 to define a receiving space 13 for receiving the terminals 2. The two insulating frame portions 12 may further protect the plurality of terminals 2 so as to prevent the plurality of terminals 2 from being impacted.

Figure 10:
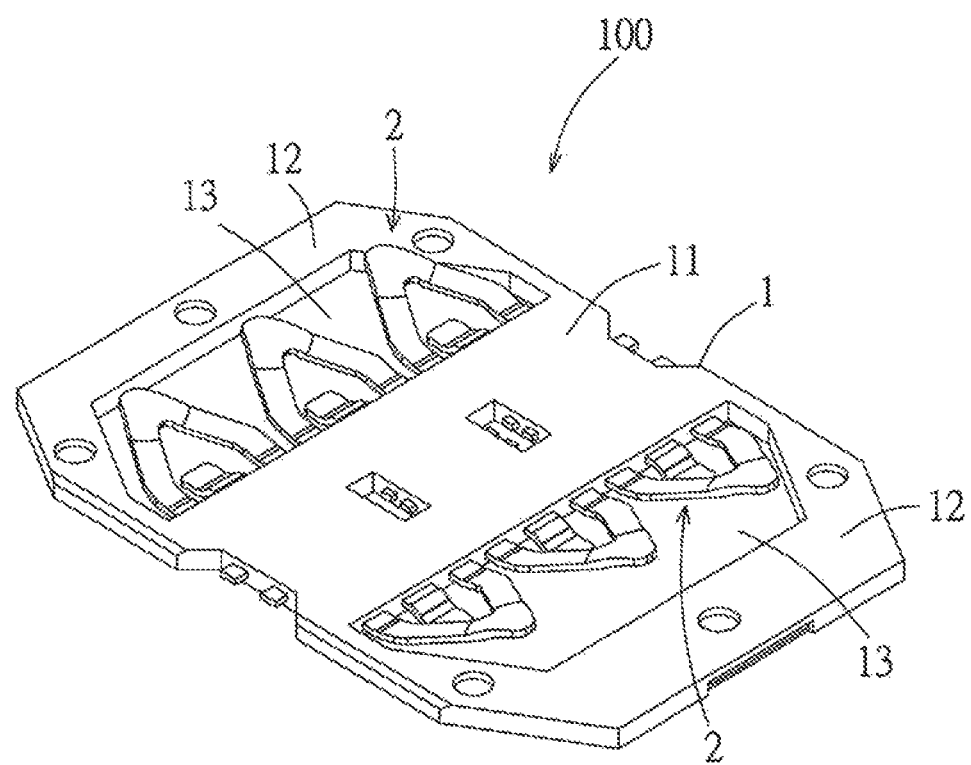
FIG. 10 is a perspective view illustrating a third embodiment of an electronic card connector of the present disclosure.
Figure 11:
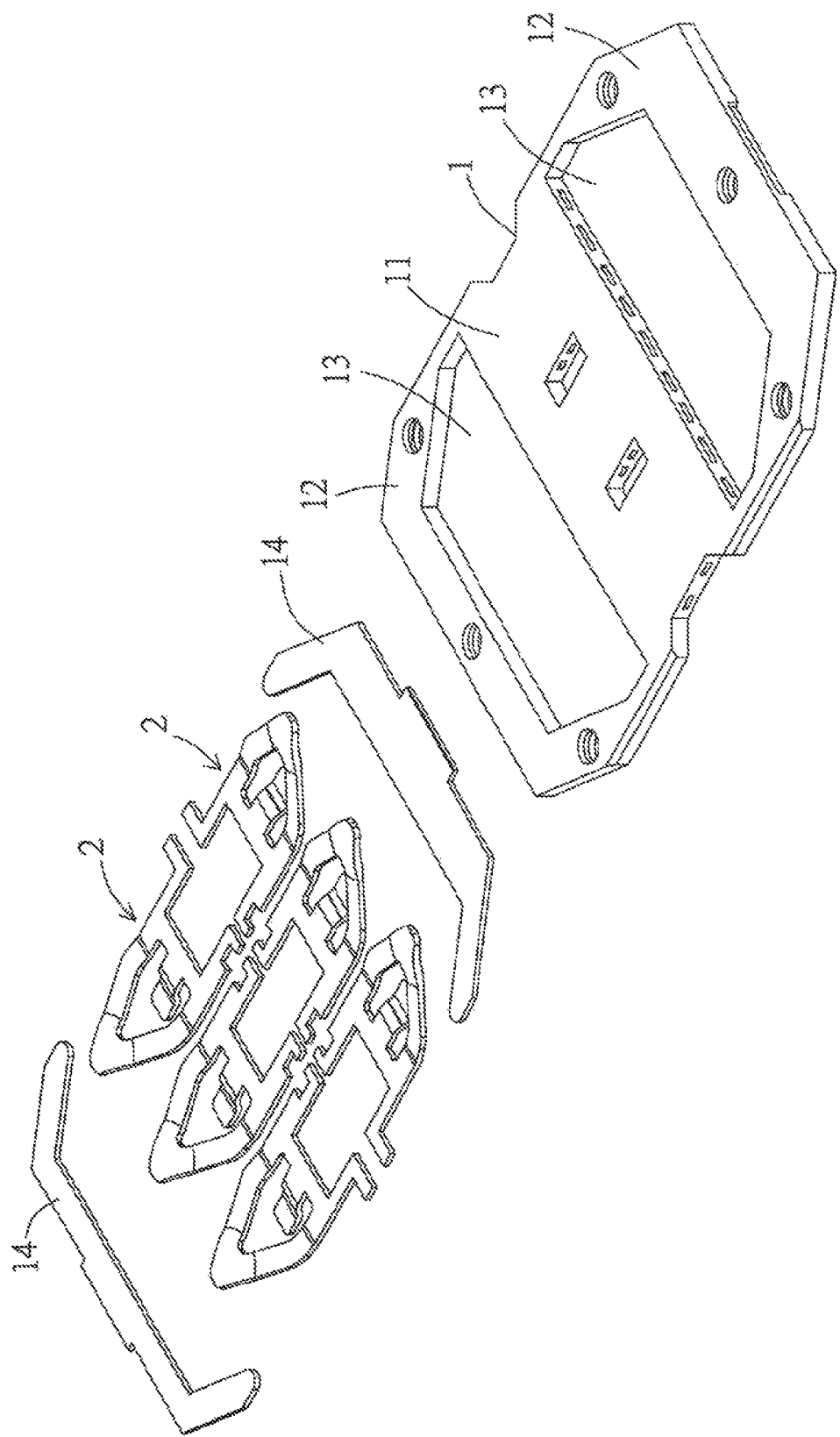
FIG. 11 is an exploded perspective view illustrating an insulating housing and terminals of the third embodiment.
Figure 12:
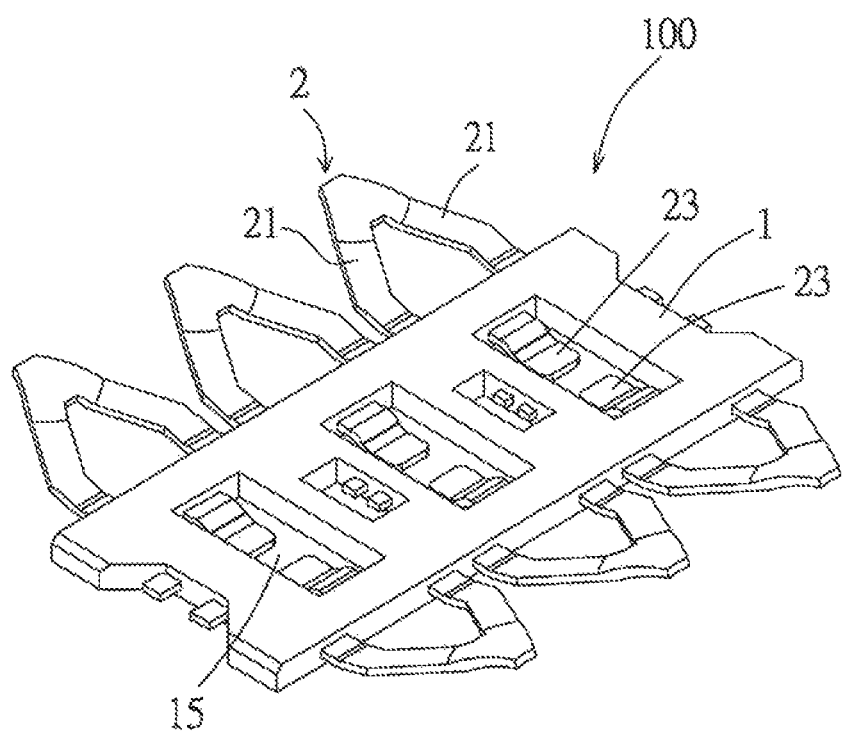
FIG. 12 is a perspective view illustrating a fourth embodiment of an electronic card connector of the present disclosure.
Figure 13:
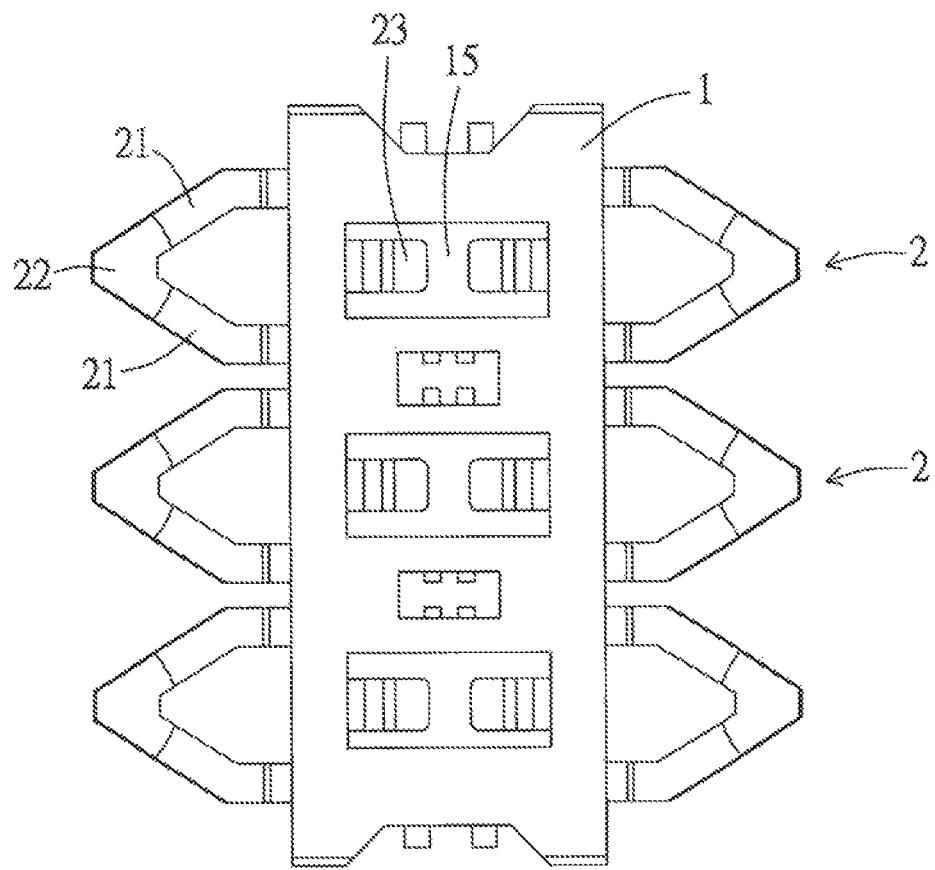
FIG. 13 is a top view illustrating the fourth embodiment.
Figure 14:
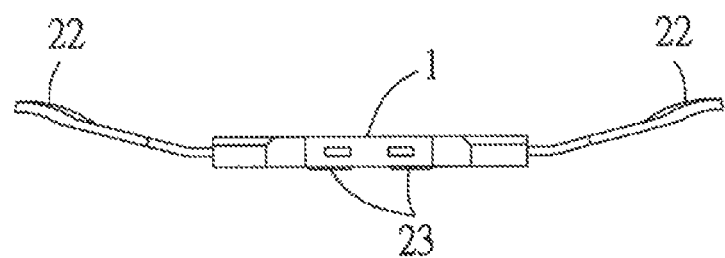
FIG. 14 is a side view illustrating the fourth embodiment.
Figure 15:
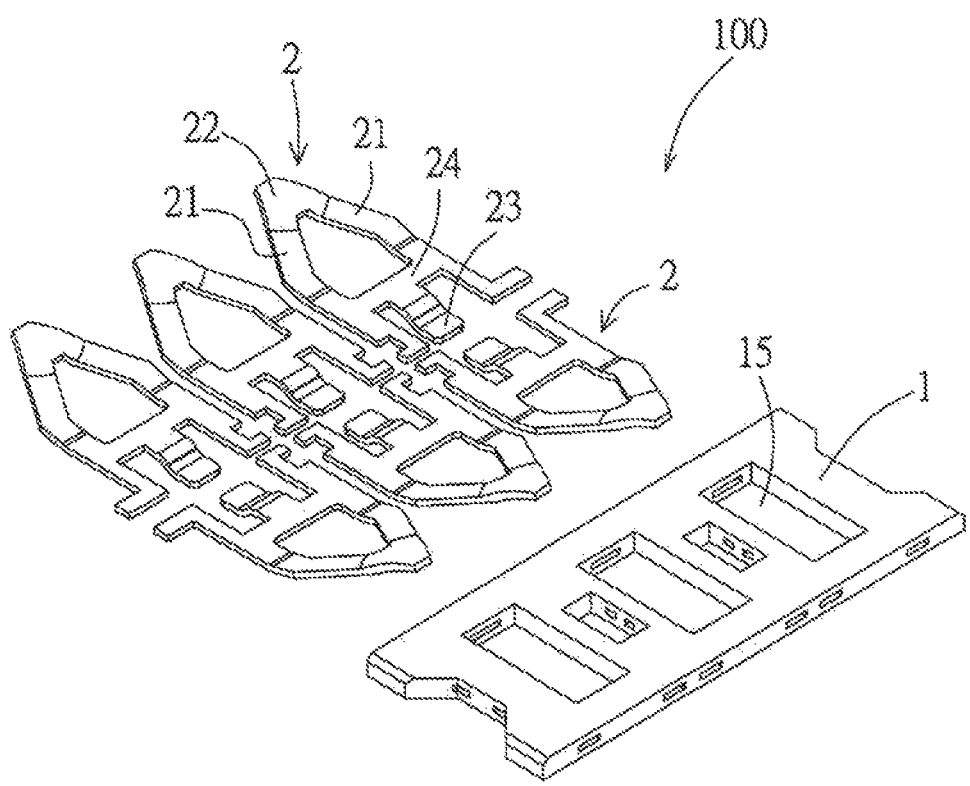
FIG. 15 is an exploded perspective view illustrating an insulating housing and terminals of the fourth embodiment.
Figure 16:
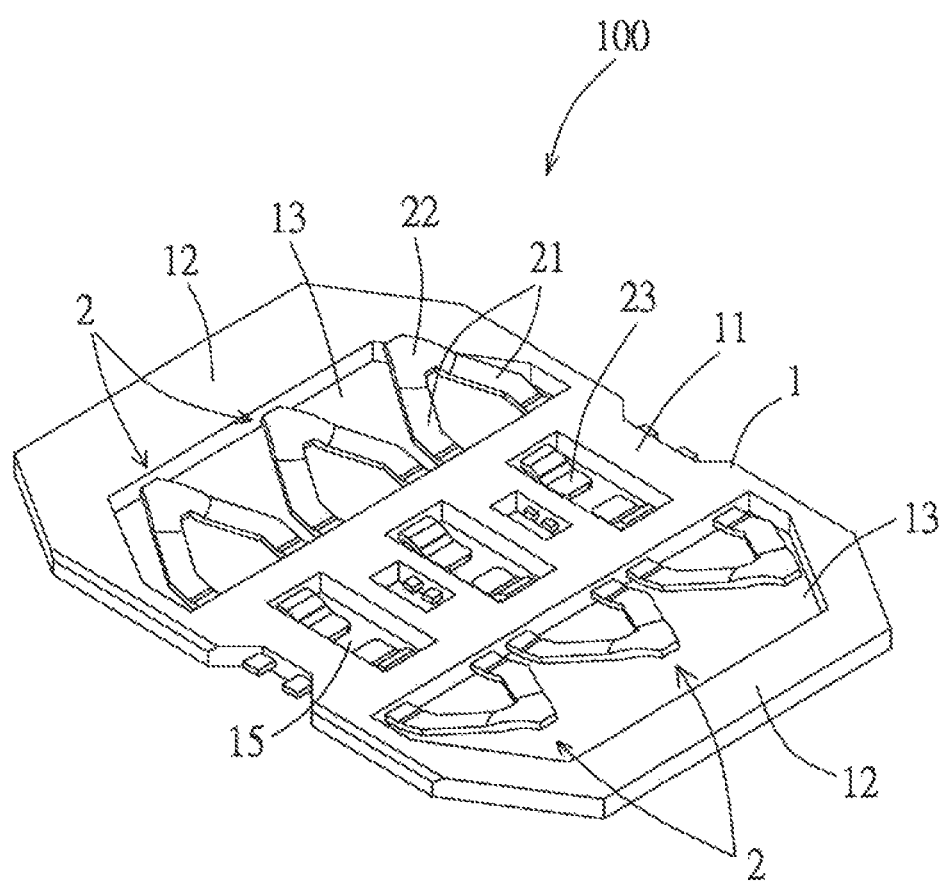
FIG. 16 is a perspective view illustrating a fifth embodiment of an electronic card connector of the present disclosure.
Figure 17:
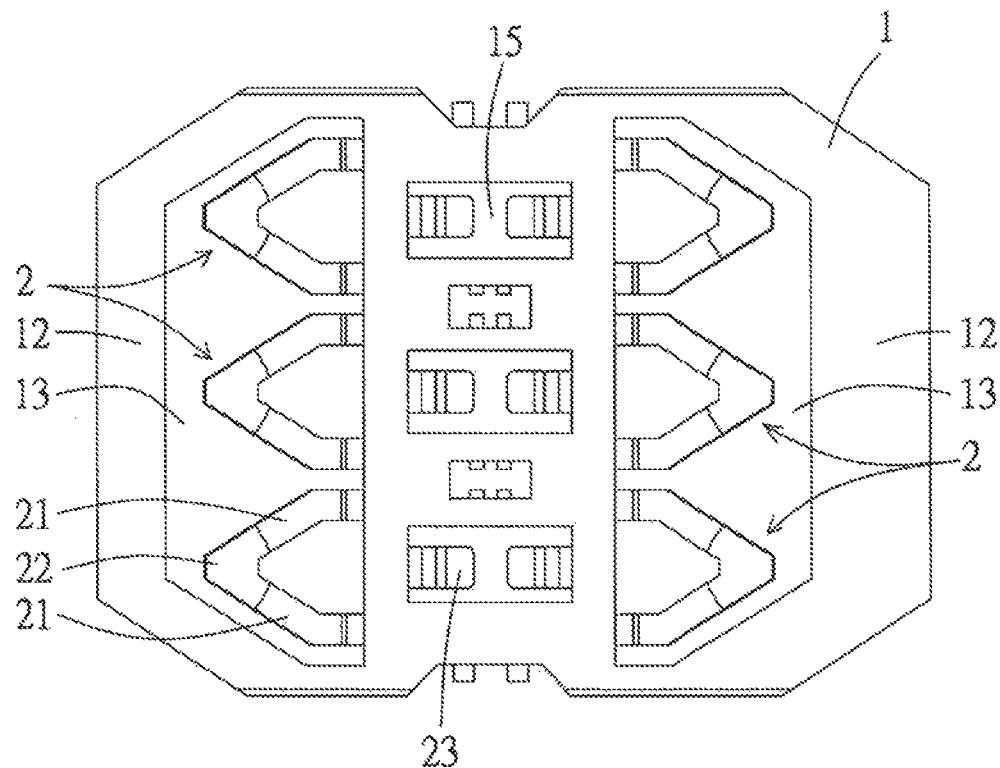
FIG. 17 is a top view illustrating the fifth embodiment.
Figure 18:
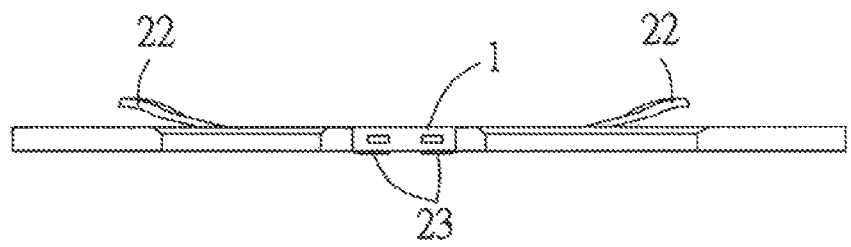
FIG. 18 is a side view illustrating the fifth embodiment.
Figure 19:
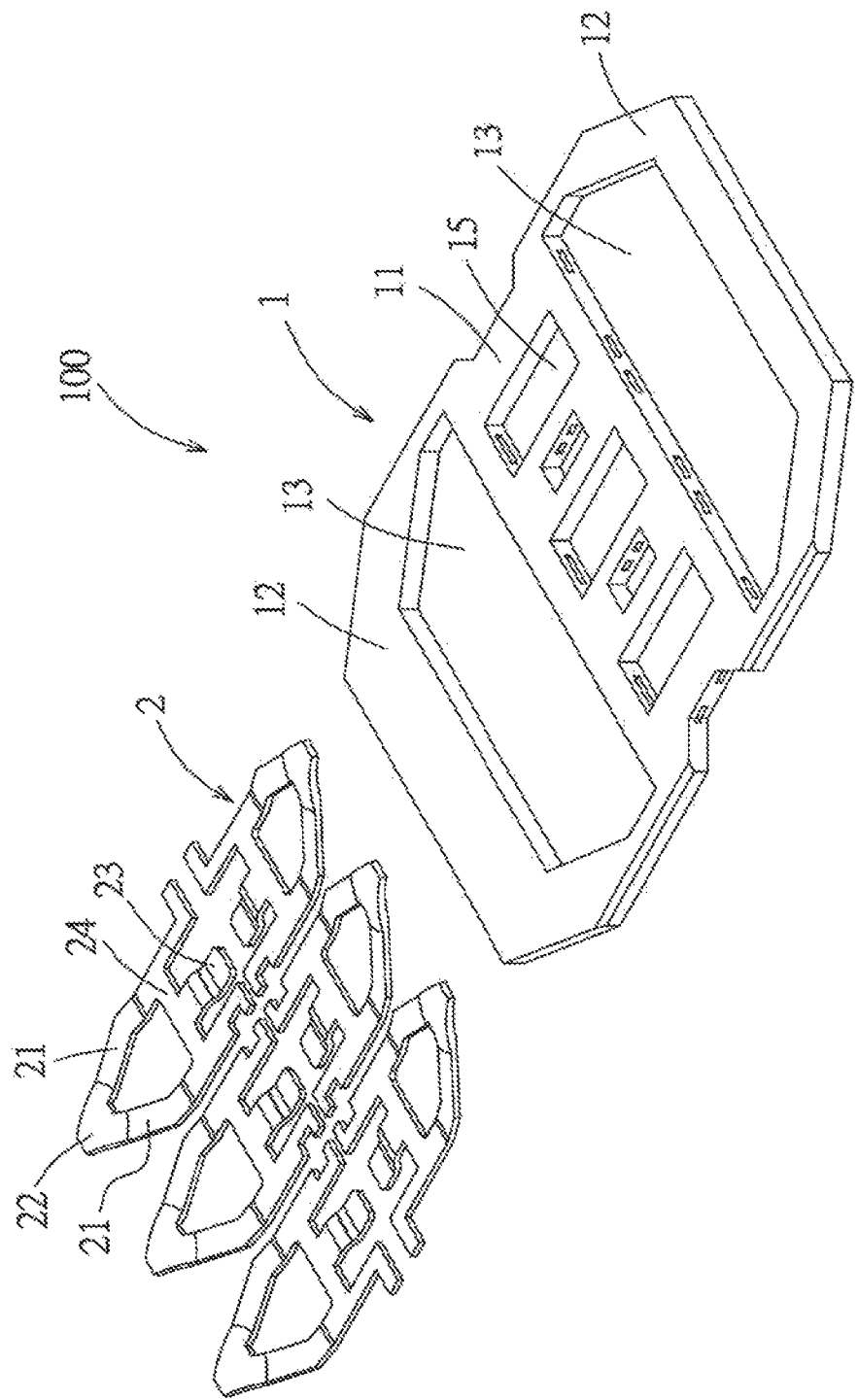
FIG. 19 is an exploded perspective view illustrating an insulating housing and terminals of the fifth embodiment.

Referring to FIG. 10 and FIG. 11, a third embodiment of an electronic card connector 100 of the present disclosure is substantially the same with the second embodiment, however, in the third embodiment, the insulating housing 1 further comprises two metal strengthening plates 14 respectively embedded in the two insulating frame portions 12, therefore the two insulating frame portions 12 is strengthened in structure so as to reduce risk that the two insulating frame portions 12 warp.

Referring to FIG. 12 to FIG. 15, a fourth embodiment of an electronic card connector 100 of the present disclosure is substantially the same with the first embodiment, however, in the fourth embodiment, the tail 23 of each terminal 2 is positioned in a groove 15 provided in the insulating housing 1.

Referring to FIG. 16 to FIG. 19, a fifth embodiment of an electronic card connector 100 of the present disclosure is substantially the same with the second embodiment, however, in the fifth embodiment, the tail 23 of each terminal 2 is positioned in a groove 15 provided in the insulating plate portion 11.

In conclusion, each contacting structure 20 comprises the convex curved surface 22 having the first portion 222 (the middle contact region) and the second portion 223 (the side contact region), it can prevent the conducting pads 81 of the electronic card 8 from being damaged due to serious scrapping during movement of the electronic card 8, and the first portion 222 (the middle contact regions) can stably contact the corresponding conducting pads 81, thereby assuring the stability of the electrical connection.

The above described are only the embodiments, which cannot limit the present disclosure, namely simple equivalent variations and modifications made according to the scope of the claims and content of the present disclosure are still fallen within the scope of the present disclosure.

What is claimed is:

1. An electronic card connector configured to be mounted on a circuit board so as to be electrically connected to an electronic card having a plurality of conducting pads, the electronic card connector comprising:
an insulating housing; and
a plurality of terminals mounted to the insulating housing, and each terminal comprising two resilient arms, a contacting structure and a tail for being soldered to the circuit board, the two resilient arms each having a first end and a second end, the two first ends of the two resilient arms being spaced apart from each other and fixed to the insulating housing, the two second ends of the two resilient arms being connected to the contacting structure, the contacting structure and the two first ends of the two resilient arms defining a substantially triangular space therebetween, the contacting structure comprising a convex curved surface, the convex curved surface having two outside edges respectively connected to two outside edges of the two resilient arms, a first portion positioned at a middle region of the convex curved surface and curved upwardly for contacting the corresponding conducting pad of the electronic card and two second portions each positioned between the first portion and the corresponding outside edge of the convex curved surface and curved downwardly from the first portion toward the corresponding outside edge of the convex curved surface, the conducting pad of the electronic card can move onto the first portion via the second portions, the two outside edges of the convex curved surface being lower than the first portion of the convex curved surface in height, wherein the tail is positioned between the two resilient arms and within the substantially triangular space.

2. The electronic card connector according to claim 1, wherein the first portion and the two second portions of the convex curved surface are identical in curvature.

3. The electronic card connector according to claim 1, wherein the insulating housing comprises an insulating plate portion, each terminal further comprises a fixed portion connecting the two resilient arms and the tail, and the fixed portion is embedded in the insulating plate portion, the plurality of terminals are mounted in the insulating plate portion in two rows, and the contacting structures of the terminals in the two rows respectively protrude at two opposite sides of the insulating plate portion.

4. The electronic card connector according to claim 3, wherein the insulating housing further comprises two insulating frame portions respectively connected to the two opposite sides of the insulating plate portion, and the two insulating frame portions each cooperate with the insulating plate portion to define a receiving space for receiving the terminals.

5. The electronic card connector according to claim 4, wherein the insulating housing further comprises two metal strengthening plates respectively embedded in the two insulating frame portions.

6. An electronic card connector configured to be mounted on a circuit board so as to be electrically connected to an electronic card having a plurality of conducting pads, the electronic card connector comprising:
an insulating housing; and
a plurality of terminals mounted to the insulating housing, and each terminal comprising two resilient arms, a contacting structure and a tail for being soldered to the circuit board, the two resilient arms each having a first end and a second end, the two first ends of the two resilient arms being spaced apart from each other and fixed to the insulating housing, the two second ends of the two resilient arms being connected to the contacting structure, the contacting structure and the two first ends of the two resilient arms defining a substantially triangular space therebetween, an overall surface of the contacting structure opposite to the circuit board being a part of a spherical surface, wherein the spherical surface of the contacting structuring opposite to the circuit board has a middle contact region for contacting the corresponding conducting pad of the electronic card and a side contact region, the conducting pad of the electronic card can move onto the middle contact region via the side contact region, wherein the tail is positioned between the two resilient arms and within the substantially triangular space.

7. The electronic card connector according to claim 6, wherein the overall surface of the contacting structure opposite to the circuit board has two outside edges respectively connected to the two outside edges of the two resilient arms, a middle contact region for contacting the corresponding conducting pad of the electronic card and a side contact region, the side contact region is adjacent to one of the two outside edges of the overall surface of the contacting structure opposite to the circuit board.

8. The electronic card connector according to claim 6, wherein the insulating housing comprises an insulating plate portion, each terminal further comprises a fixed portion connecting the two resilient arms and the tail, and the fixed portion is embedded in the insulating plate portion, the plurality of terminals are mounted in the insulating plate portion in two rows, and the contacting structures of the terminals in the two rows respectively protrude at two opposite sides of the insulating plate portion.

9. The electronic card connector according to claim 8, wherein the insulating housing further comprises two insulating frame portions respectively connected to the two opposite sides of the insulating plate portion, and the two insulating frame portions each cooperate with the insulating plate portion to define a receiving space for receiving the terminals.

10. The electronic card connector according to claim 9, wherein the insulating housing further comprises two metal strengthening plates respectively embedded in the two insulating frame portions.

* * * * *